United States Patent
chen et al.

(10) Patent No.: US 7,604,360 B2
(45) Date of Patent: Oct. 20, 2009

(54) INTEGRATED SENSOR FOR CORRELATED COLOR TEMPERATURE AND ILLUMINANCE SENSING

(75) Inventors: Dengpeng chen, Singapore (SG); Chi Boon Ong, Singapore (SG); Chee Heng Wong, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 350 days.

(21) Appl. No.: 11/618,420

(22) Filed: Dec. 29, 2006

(65) Prior Publication Data

US 2008/0158548 A1    Jul. 3, 2008

(51) Int. Cl.
*G03B 15/02* (2006.01)
*H04N 5/222* (2006.01)

(52) U.S. Cl. .............................. 362/5; 362/2; 362/293; 348/371

(58) Field of Classification Search ................. 362/3–5, 362/231, 293; 348/371; 250/221, 208
See application file for complete search history.

(56) References Cited

U.S. PATENT DOCUMENTS

| | | | |
|---|---|---|---|
| 6,137,535 A * | 10/2000 | Meyers | 348/340 |
| 6,714,239 B2 * | 3/2004 | Guidash | 348/223.1 |
| 2005/0013602 A1 * | 1/2005 | Ogawa | 396/157 |
| 2005/0052547 A1 * | 3/2005 | Minakuti et al. | 348/224.1 |
| 2005/0248688 A1 * | 11/2005 | Kimura et al. | 348/655 |
| 2006/0045512 A1 * | 3/2006 | Imamura et al. | 396/225 |
| 2008/0029708 A1 * | 2/2008 | Olsen et al. | 250/372 |

* cited by examiner

*Primary Examiner*—Ali Alavi

(57) ABSTRACT

A sensor for measuring the properties of light from a light source is disclosed. The sensor includes first and second photodetectors that are illuminated by the light. The first and second photodetectors generate first and second photodetector signals indicative of the first and second weighted averages of the intensity of light in a wavelength band between 400 nm and 700 nm. The first photodiode is more sensitive to light having wavelengths between 400 nm and 500 nm than the second photodetector. The sensor also includes a color temperature processing circuit that generates a first processed signal that is related to a ratio of the first and second signals. The color temperature processing circuit could include first and second logarithmic amplifiers that generate first and second logarithmic signals, respectively, from the first and second photodetector signals and a subtraction circuit that forms a signal indicative of the difference between the first and second logarithmic signals.

7 Claims, 3 Drawing Sheets

INTEGRATED SENSOR FOR CORRELATED COLOR TEMPERATURE AND ILLUMINANCE SENSING

BACKGROUND OF THE INVENTION

The appearance of objects that are illuminated by a light source depends both on the properties of the object and the spectral content of the light source. The image formed when a picture is taken of a scene that is illuminated by a light source depends on both the spectral content of the light source and the reflectivity of the objects in the scene as a function of wavelength. For example, an image taken by a digital camera is typically divided into a number of pixels, each pixel representing the light received from a corresponding point in the image. The light reaching a pixel is a complex spectrum that can be represented as a set of intensity values for each of a large number of wavelengths. In the simplest case, the intensity value at any given wavelength is related to the amount of light reaching the corresponding point in the scene from the light source at that wavelength and the fraction of the light at that wavelength that is reflected by the corresponding point in the scene. The spectrum reaching each pixel is typically reduced to three color intensity values that, if input to the human eye, would cause a human observer to perceive the same color for that point that the observer would have perceived if the original spectrum at that point was directed into the observer's eye.

Similarly, consider a transparency that is illuminated from behind by a light source. In the simplest case, the light reaching the observer from each point on the transparency is related to the spectrum emitted by the light source and the absorption of light by the transparency as a function of wavelength at that point. Hence, the appearance of the transparency also depends both on the transparency and the spectral content of the light source.

To some extent, the human eye adapts to different illumination sources so that the perceived colors in a scene illuminated with light from two different light sources appear to be the same even though the light sources have different spectral content. However, cameras do not have this ability. Hence, algorithms that are designed to compensate for differences in the spectral content of the light sources are often included in modern digital cameras. Given a picture of a scene and a knowledge of the spectral content of the illumination source, the algorithm generates a new picture that ideally represents the picture of the scene that would have been produced if a standard light source had been utilized as the illumination source.

One class of light sources that are used to illuminate objects emit "white" light. These light sources emit light that a viewer perceives as approximating the spectrum emitted by a black body that is heated to a high temperature. Since the spectrum changes as a function of temperature, the output spectrum is typically specified by the temperature of the black body that emits a spectrum that approximates the spectrum of the white light source. While not all light sources that are perceived by a human observer as being a white light source of a particular color temperature have identical spectrums, the approximation is often useful.

For example, consider a picture that was taken with a particular white light source. In some cases, the user wishes to know how the image would have appeared if it had been taken by a "standard" white light source that is different than the one utilized. This is often referred to as "white balancing". Cameras with white balance settings for illumination by sun light, fluorescent lights, and incandescent lights of various color temperatures are known. Given a knowledge of which light source was used, the camera can rebalance the color of the image to provide the image that would have been seen if the standard light source had been utilized.

In such cameras, the user must decide which of the settings correspond most closely to the lighting conditions present at the time the image was taken. If the user cannot decide on the correct setting, or if none of the settings are a good approximation to the light source used, effective color compensation cannot be performed in the camera. Furthermore, compensation by a separate image processor is also not possible, since the separate image processor lacks any measurement of the actual spectrum used to form the image in the first place. If the camera had a sensor that measured the color temperature of the light source, the camera could automatically generate the data needed to perform the color balancing operation.

Many digital cameras provide an automatic white balancing setting that utilizes the spectrum content of the image itself to determine the spectral content of the illumination source. The algorithms utilized assume that the spectral content of the image as a whole is representative of the spectral content of the light source. Such systems perform poorly if the image is biased toward a particular color. To provide better color balancing, the camera needs to have a measure of the spectral content of the illumination source independent of the particular scene being imaged.

In addition, many light sources have adjustments that allow the effective color temperature of the light source to be adjusted. For example, the current through the filament of an incandescent lamp can be increased or decreased to alter the color temperature of the light from the lamp. Similarly, solid-state light sources that utilize LEDs of different colors to generate white light can be adjusted by altering the power delivered to the various colored LEDs.

In many cases, the output of a light source drifts over time, and a servo loop is used to correct for the drift by altering the parameters that control the color temperature of the light source. This type of servo also relies on a light sensor that detects the color temperature of the light source.

The color temperature and intensity of the optimum light source for illuminating a backlit displace such as an LCD display depends on the color temperature and intensity of the ambient light in the room in which the display is located. It has been found that the color temperature and intensity can be altered to provide a more comfortable viewing experience for a human observer. Hence, a sensor that measures the color temperature and intensity of the room lighting is needed in systems that alter the display color temperature in an attempt to realize a more optimum illumination.

In principle, a color temperature sensor could be constructed from a number of photodetectors that measure the output of the light source in a number of different wavelength bands. Sensors based on photodiodes that are covered with bandpass filters that determine the wavelength band viewed by each photodiode are known to the art.

However, a color temperature sensor for use in consumer products is constrained by the cost of the sensor. Typically, the consumer products of interest depend on custom integrated circuits that are fabricated in CMOS. Hence, to reduce the cost of the sensor, the sensor should be capable of being fabricated in CMOS as part of the custom IC that implements the other functions inherent in the product. The type of multi-photodiode sensor discussed above is not easily implemented in this technology, because each photo-diode must be covered with a layer of material that provides the bandpass filter function for that photodiode, and hence, a number of additional masking and deposition steps are required after the integrated circuit having the photodiodes is finished.

In addition, at least 3 photodiodes are used with such sensors together with computational hardware that corrects the output of the photodiodes to provide the intensities of the light source at three colors that can be used to compute a location in a conventional color space, which, in turn, is used to compute the color temperature of the light source.

As noted above, in some applications the intensity of the ambient light must also be measured. The intensity value that is needed is the value that matches the perceived intensity as viewed by a human observer. Intensity values based on a single photodiode do not provide intensity measurements that agree with the intensity perceived by a human observer when the spectral content of the light source varies. For example, consider the case of a fluorescent light and an incandescent light that are perceived by a human observer as being of the same intensity. The intensity values generated by a single photodiode for these two sources differ significantly. Hence, a sensor that is to measure both color temperature and light intensity as perceived by a human observer requires additional photodiodes.

SUMMARY OF THE INVENTION

The present invention includes a sensor for measuring the properties of light from a light source. The sensor includes first and second photodetectors that are illuminated by the light. The first and second photodetectors generate first and second photodetector signals indicative of first and second weighted averages of the intensity of light in a wavelength band between 400 nm and 700 nm. The first photodiode is more sensitive to light having wavelengths between 400 nm and 500 nm than the second photodetector. The sensor also includes a color temperature processing circuit that generates a first processed signal that is related to a ratio of the first and second signals. In one aspect of the invention, the color temperature processing circuit includes first and second logarithmic amplifiers that generate first and second logarithmic signals, respectively, from the first and second photodetector signals and a subtraction circuit that forms a signal indicative of the difference between the first and second logarithmic signals. In another aspect of the invention, a color temperature calculating circuit generates a color temperature output signal indicative of a color temperature corresponding to the light source from the first processed signal. The color temperature output signal can be generated by interpolating a calibration curve relating the color temperature of the light source to the first processed signal.

In another aspect of the invention, the sensor also includes a light intensity processing circuit that generates a second processed signal that is related to a product of the first and second photodetector signals. This signal can be interpolated to provide a measurement of the intensity of the light from the light source.

DETAILED DESCRIPTION OF THE PREFERRED EMBODIMENTS OF THE INVENTION

Figure 1:
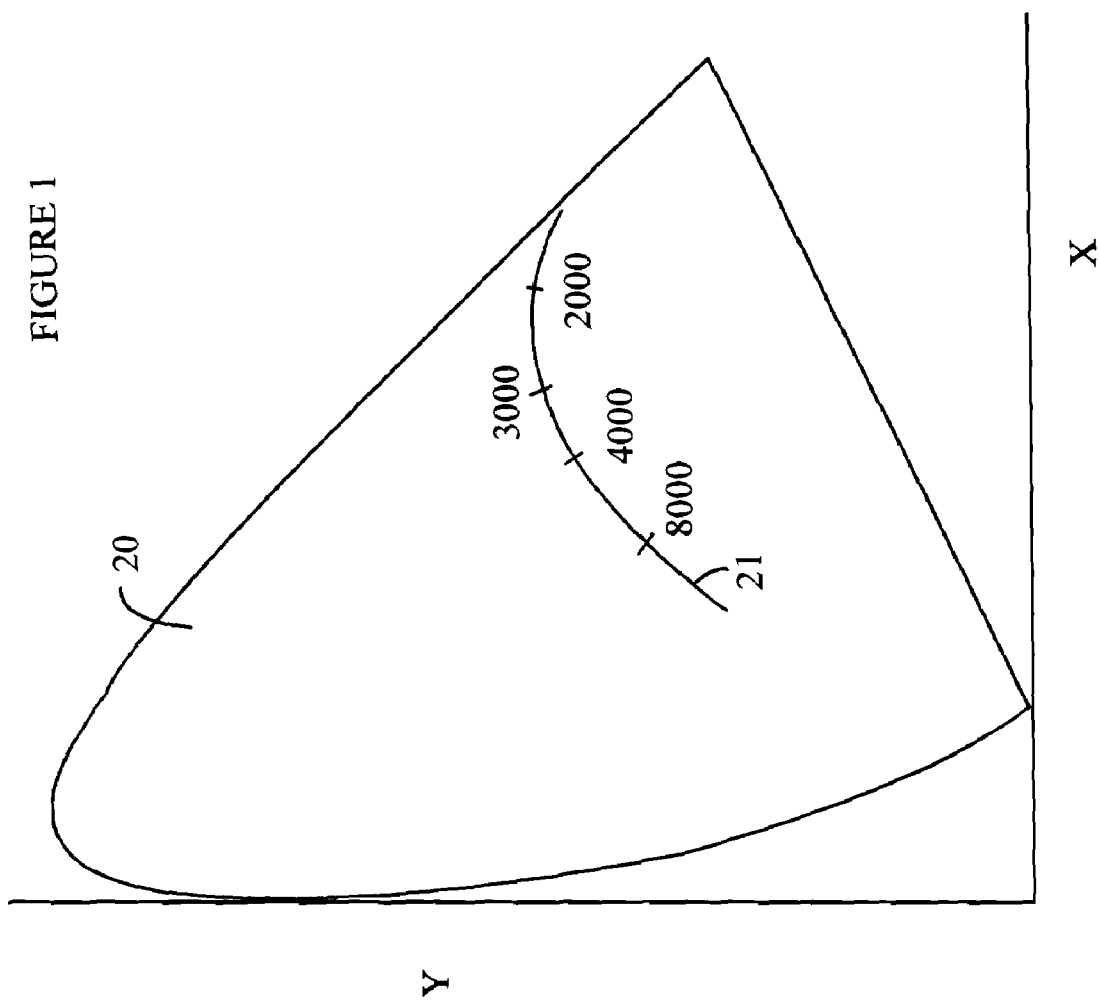
FIG. 1 illustrates curve 21 in the CIE 1976 color space 20 corresponding to a black body light source at various color temperatures.

The manner in which the present invention provides its advantages can be more easily understood with reference to FIG. 1, which illustrates a curve 21 in the CIE 1976 color space 20 corresponding to a black body light source at various color temperatures. In general, three color measurements are required to determine a point within the color space. The present invention makes use of the observation that determining a point on the black body curve 21 requires only two points, since the point is constrained to lie on the curve. For example, the ratio of the output of a detector that measures light in the blue region of the optical spectrum to the output of a detector that measures light in the red region of the optical spectrum can be used with an appropriate calibration curve to determine the color temperature of a source whose output lies on curve 21.

To provide an economically attractive color temperature sensor, the detectors should be capable of being fabricated in a CMOS process that does not require individual bandpass filters over each photodetector. As noted above, the individual bandpass filters require additional high lithographic deposition steps that increase the cost of the fabrication process.

The present invention avoids the problems associated with providing individual bandpass filters by utilizing photodiodes that inherently have different wavelength sensitivity functions. In one embodiment, the output of the first photodiode increases with wavelength, and the output of the second photodiode decreases with wavelength for wavelengths in the visible range. The sensitivity of a photodiode varies with the depth of the p-n junction as measured from the surface of the sensor that receives the light. A photodiode having a p-n junction near the surface is more sensitive to light in the blue region of the spectrum than a photodiode having a p-n junction further from the surface. Hence, two photodiodes having different sensitivities can be provided that generate outputs having different wavelength dependencies within the visible range.

In addition, the color temperature sensor should be operative over a large range of light intensities. For example, a color temperature sensor for use in a digital camera to perform automatic white balancing must be capable of measuring the color temperature of the illumination source over a range of light intensities that can vary by a factor of 1000 or more. Providing an output signal that is proportional to the intensity of light in these situations is not practical, since the circuitry that processes the light signals has a fixed maximum potential and sensitivity. If the circuitry is set to provide the maximum output at the highest intensity, then the sensitivity of the circuitry at the lowest light levels is insufficient. In this regard, it should be noted that many circuit elements have intrinsic noise that overwhelms very small signals. If, on the other hand, the circuits are designed to provide adequate sensitivity at the low light levels, the circuits will saturate at the high light levels and differences in intensity levels at high light intensities cannot be measured.

The present invention overcomes this problem by utilizing a processing circuit that operates on signals that are proportional to the logarithm of the photocurrent generated by the photodiodes. In addition to providing an increased dynamic range, this arrangement also simplifies the computation of the ratio of the photodiode signals, since a simple subtraction circuit can be utilized to provide the ratio of the two lights received by the blue and red photodetectors.

Finally, many applications that require a color temperature sensor also require a measurement of the ambient light intensity. In particular, a light intensity signal that agrees with the perceived intensity as seen by a human observer is particularly useful. The present invention provides this feature by generating a signal that is related to the intensity of light in the band of wavelengths that are utilized by the human eye. As will be explained in more detail below, the present invention utilizes the sum of the two logarithmic signals to provide an intensity measurement that more closely agrees with the light intensity that would be perceived by a human observer.

Figure 2:
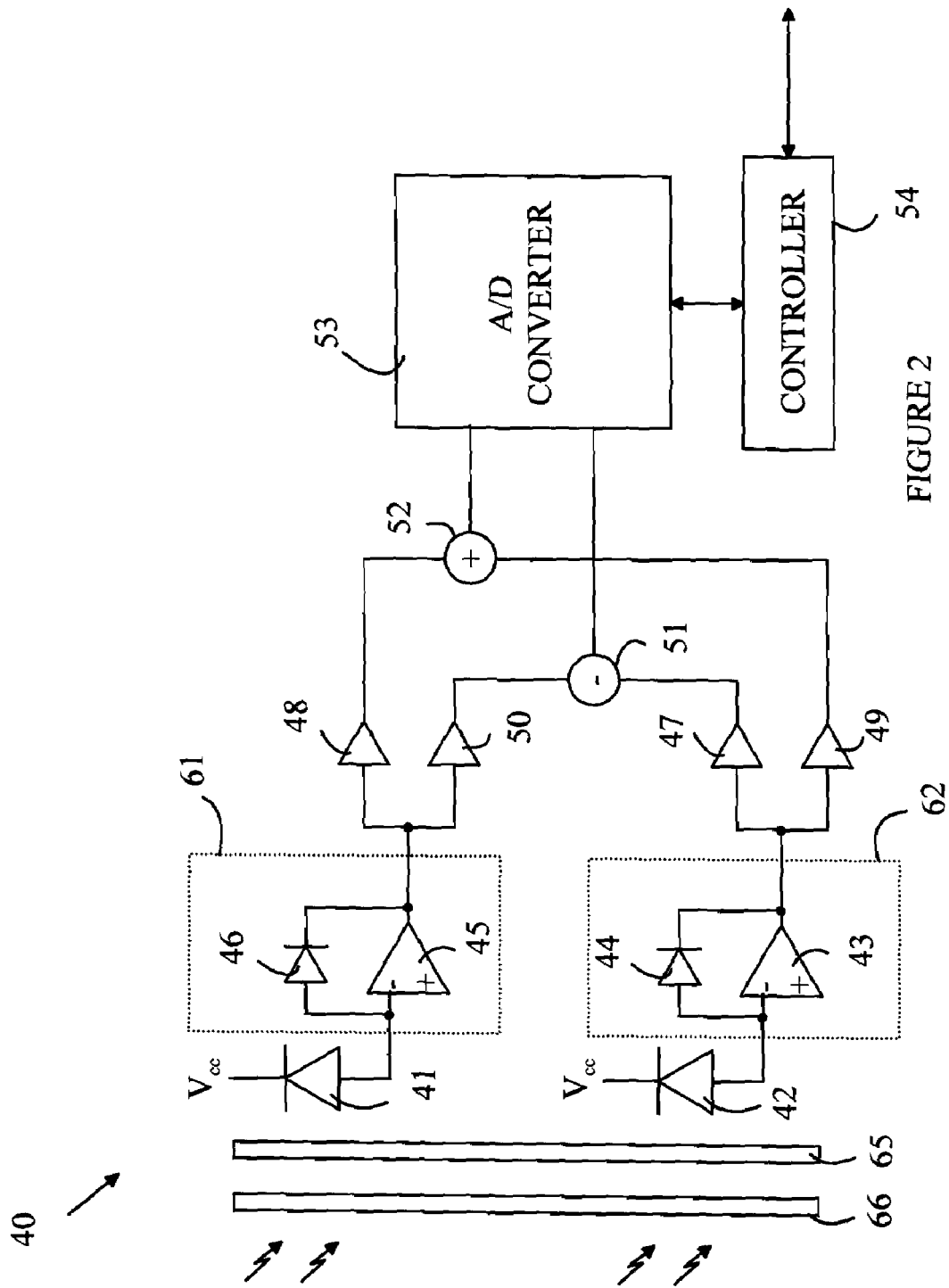
FIG. 2 is a schematic drawing of a color temperature sensor 40 according to one embodiment of the present invention.

Refer now to FIG. 2, which is a schematic drawing of a color temperature sensor 40 according to one embodiment of the present invention. Color temperature sensor 40 utilizes photodiodes 41 and 42 to measure the light that is received by color temperature sensor 40. Photodiode 41 is more sensitive in the blue portion of the spectrum and has a sensitivity that decreases a function of wavelength for light in the visual range. Photodiode 42 is more sensitive in the red portion of the spectrum and has a sensitivity that increases with wavelength for wavelengths in the visible range. In the embodiment shown in FIG. 2, the photocurrent through photodiode 41 is converted to a voltage that is proportional to the logarithm of the photocurrent by logarithmic amplifier 61 in which the feedback loop used by amplifier 45 includes a diode 46 rather than a resistor. Similarly, the photocurrent through photodiode 42 is converted to a voltage that is proportional to the logarithm of the photocurrent by logarithmic amplifier 62 that includes an amplifier 43 and feedback diode 44.

The ratio of the photocurrents in the photodiodes is generated by subtraction circuit 51, which subtracts the logarithmic output of the logarithmic amplifiers to form a signal that is proportional to the ratio of the two photocurrents. To compensate for gain differences in the photodiodes and/or logarithmic amplifiers, the output of each of logarithmic amplifiers 61 and 62 can be scaled by the optional buffers shown at 50 and 47, respectively, before being subtracted.

The output of subtraction circuit 51 has a one-to-one correspondence to the color temperature of the white light source that illuminates the two photodiodes. The corresponding calibration curve can be included in controller 54, which receives the digitized output from A/D converter 53. The calibration curve can be generated during a calibration procedure in which a calibrated light source is used to illuminate color temperature sensor 40. For example, color temperature sensor 40 could be exposed sequentially to light having a known sequence of color temperatures and controller 54 would then record the digitized output from subtraction circuit 51 and store the result in a memory within controller 54. This stored calibration table could then be interpolated to provide a color temperature output during the normal operation of color temperature sensor 40.

It should be noted that A/D converter 53 and controller 54 are optional. Embodiments in which the raw analog signal from subtraction circuit 51 is output to a device connected to the color temperature sensor could also be constructed. In such embodiments, the relevant calibration curve and color temperature computation would be provided by the device attached to color temperature sensor 40. Such embodiments are useful when the color temperature sensor is included in a system such as a digital camera or an LCD display that already has a suitable analog to digital converter and a data processing system that can provide the controller function.

It should be noted that the controller could be a specialized data processor, or a more general generic controller chip. Such single chip controllers are available as stand-alone processors or as standard cells that can be included in custom integrated circuits.

As noted above, in some applications, an intensity sensor that measures the intensity of the light in a manner that duplicates the intensity that a human observer would perceive is also useful. With the proper choice of photodiodes, color temperature sensor 40 could also provide such an intensity measurement. As will be discussed in more detail below, the sum of the two logarithmic voltages provides a signal that has a one-to-one relationship to the intensity that would be perceived by a human observer. Accordingly, color temperature sensor 40 includes a sum circuit 52 that provides a signal that is proportional to the sum of the two logarithmic voltages. To compensate for gain differences in the photodiodes and/or logarithmic amplifiers, the output of each of logarithmic amplifiers 61 and 62 can be scaled by the optional buffers shown at 48 and 49, respectively, before being added. Controller 54 could likewise provide a digital output of the light intensity by digitizing the output of sum circuit 52 and using an appropriate calibration curve that is stored in controller 54.

As noted above, the photodiodes achieve different wavelength sensitivities by using photodiode designs that have the p-n junction located at different depths from the surface of the sensor. These photodiodes can have sensitivities to light outside the range of wavelengths to which the human eye is sensitive. Hence, in one embodiment of the present invention, a bandpass filter 65 is utilized to remove light at those wavelengths outside the human visual range to which the photodiodes are sensitive. For example, a filter with a short wavelength cutoff between 400-450 nm and a long wavelength cutoff between 650-700 nm could be utilized.

It should be noted that such a filter does not require photolithographic patterning and deposition steps that are different for the two photodiodes. The same filter covers both of the photodiodes. In addition, the filter can be constructed as a sheet of thin film material that is diced to provide small filters that are either bonded to the sensor surface or merely mounted in the optical path that the light being measured traverses in route to the sensor.

In one embodiment of the present invention, color temperature sensor 40 also includes a light mixing layer 66 that includes a diffuser that mixes the light before the light reaches the sensor to remove any spatial inhomogeneities in the light before the light reaches the photodiodes. It should be noted that the photodiodes and controller are typically covered by an epoxy layer that protects the dies from moisture. The filter and diffuser can be molded into this epoxy layer.

As noted above, the present invention preferably utilizes photodiodes that can be constructed in a conventional CMOS fabrication process. If the sensor is to provide both color temperature and illumination intensity information consistent with the intensity that would be perceived by a human observer using the same two photodiodes used to measure the color temperature, then the sensitivity of the two photodiodes needs to conform to additional constraints beyond those needed for just measuring the color temperature of the light source. First, the sensitivity ranges of both of the photodiodes should extend across the visual spectrum from about 450 nm to 650 nm.

Figure 4:
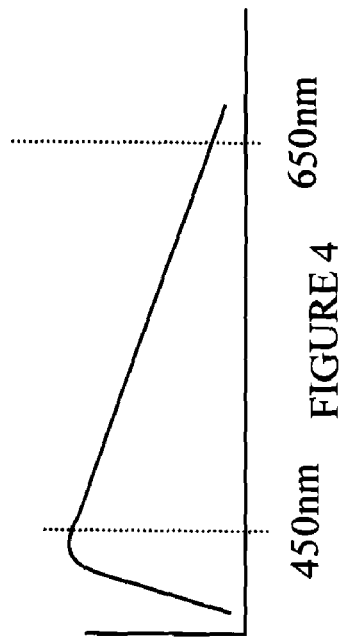
FIGS. 3 and 4 illustrate the outputs of two photodiodes that have the preferred sensitivity profiles.
Figure 3:
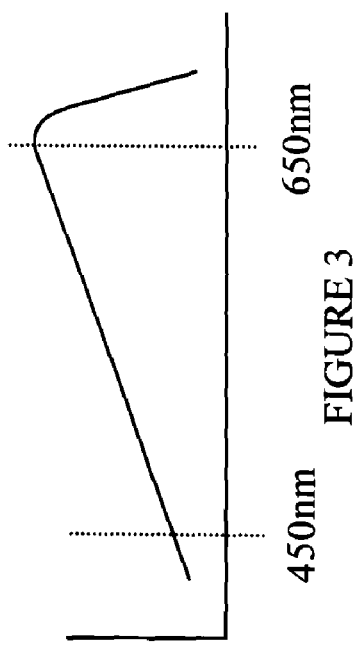

Refer now to FIGS. 3 and 4, which illustrate the outputs of two photodiodes that have the preferred sensitivity profiles. One of the photodiodes should ideally have an output that increases linearly from 450 nm over this range as shown in FIG. 3. The other photodiode should ideally have an output that decreases linearly from 450 nm over this range as shown in FIG. 4. The sensitivity of the photodiodes in the ranges above and below the range from 450 to 650 is removed by the use of the bandpass filter discussed above. It has been found that the product of the outputs of two photodiodes that have these profiles, i.e., the sum of the logarithmic outputs, provides an intensity profile that more closely matches the sensitivity of the human eye.

Figure 5:
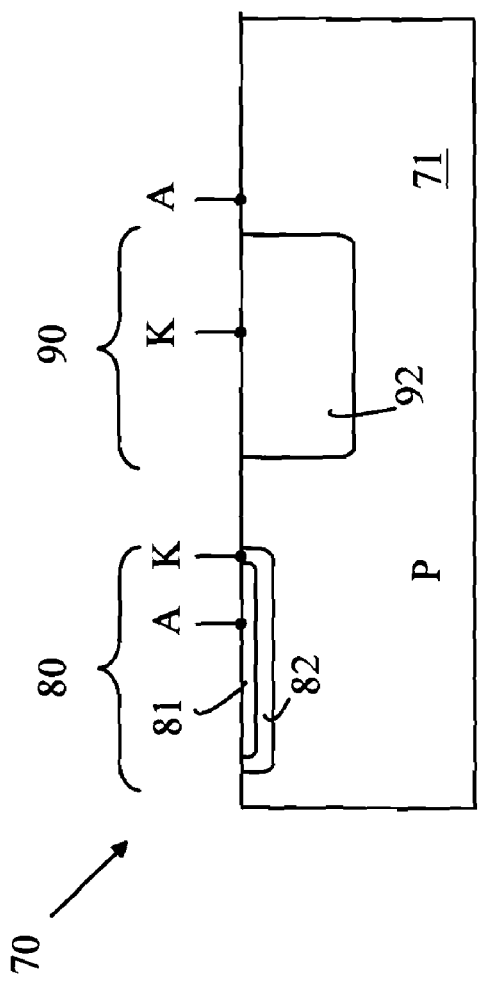
FIG. 5 is a cross-sectional view of a pair of photodiodes according to one embodiment of the present invention.

Photodiodes that approximate these ideal curves can be fabricated in CMOS. The sensitivity profiles are adjusted by adjusting the depth of the p-n junction in the photodiode. As noted above, photodiodes with deep p-n junctions are more sensitive to light having longer wavelengths and those with p-n junctions closer to the light receiving surface are more sensitive to light having shorter wavelengths. Refer now to FIG. 5, which is a cross-sectional view of a pair of photodiodes constructed on a substrate 71. For the purposes of this example, it will be assumed that substrate 71 is p-type. Photodiode 80 is more sensitive to light in the blue region of the optical spectrum and provides an approximation to the intensity profile shown in FIG. 4. Photodiode 80 has an n-well 82 and a p+ anode 81. The cathode, K, is connected to n-well 82. Photodiode 90 is more sensitive in the red region of the optical spectrum and provides an approximation to the intensity profile shown in FIG. 3. Photodiode utilize a deep n-well 92 for the cathode and the substrate 71 as the anode A. While photodiode pair 70 is constructed on a p-substrate, analogous embodiments that utilize an n-substrate can also be constructed.

The above-described embodiments of the present invention utilize photodiodes to measure the light intensity from the light source that is being measured. However, embodiments based on other forms of photodetectors such as phototransistors could also be constructed.

In addition, it should be also noted that other methods for providing a signal related to the ratio of the light intensities in the blue and red regions of the spectrum could also be utilized. For example, if the range of intensities over which the sensor must function is limited, an embodiment of the present invention that generates the ratio of the light intensities using conventional linear amplifiers could also be constructed.

Various modifications to the present invention will become apparent to those skilled in the art from the foregoing description and accompanying drawings. Accordingly, the present invention is to be limited solely by the scope of the following claims.

What is claimed is:

1. A CMOS integrated circuit sensor for measuring light from a light source, said sensor comprising:

first and second photodiodes that are illuminated by said light, said first and second photodiodes generating first and second photodiode output signals indicative of first and second weighted averages of the intensity of light in a wavelength band between 400 nm and 700 nm, said first photodiode being more sensitive to light having wavelengths between 400 nm and 500 nm than said second-photodiode, said first and second photodiodes being characterized by first and second distances, respectively, from a surface of said sensor to first and second p-n junctions associated. respectively, with said first and second photodiodes, said first distance being different from said second distance, neither of said photodiodes having an individual CMOS bandpass filter disposed thereover, and a color temperature processing circuit that generates a first processed signal that is related to a ratio of said first and second signals.

2. The CMOS sensor of claim 1 wherein said processing circuit comprises first and second logarithmic amplifiers that generate first and second logarithmic signals, respectively, from said first and second photodiode output signals and a subtraction circuit that forms a signal indicative of the difference between said first and second logarithmic signals and generates said first processed signal therefrom.

3. The CMOS integrated circuit sensor of claim 1 further comprising a temperature calculating circuit that generates a color temperature output signal indicative of a color temperature corresponding to said light source from said first processed signal.

4. The CMOS integrated circuit sensor of claim 3 wherein said temperature calculating circuit comprises a controller that stores a calibration curve relating said first processed signal to said color temperature output signal, and wherein said controller interpolates said calibration curve to provide said color temperature output signal.

5. The CMOS integrated circuit sensor of claim 1 further comprising a light intensity processing circuit that generates a second processed signal that is related to a product of said first and second photodiode output signals.

6. The CMOS integrated circuit sensor of claim 5 further comprising a circuit that generates a light intensity output signal indicative of an intensity of light received by said sensor in said wavelength band from said second processed signal.

7. The CMOS integrated circuit sensor of claim 1 further comprising a single bandpass filter that blocks light having wavelengths below 400 nm and above 700 nm from reaching said first and second photodiodes, said filter comprising a uniform layer of material that is located between said light source and both of said photodiodes.

* * * * *